United States Patent [19]
Valdiserri

[11] Patent Number: 4,614,756
[45] Date of Patent: Sep. 30, 1986

[54] STABILIZATION COMPOSITION FOR CLEAN, IMPACT-MODIFIED PVC

[75] Inventor: Leo L. Valdiserri, Little Hocking, Ohio

[73] Assignee: Borg-Warner Chemicals, Inc., Parkersburg, W. Va.

[21] Appl. No.: 761,445

[22] Filed: Aug. 1, 1985

[51] Int. Cl.[4] ................................ C08K 5/51
[52] U.S. Cl. ................................ 524/147; 524/180; 524/394; 252/400 A; 252/400 R
[58] Field of Search ................ 524/147, 180, 394; 252/400 A, 400 R, 400.24, 400.51, 400.52

[56] References Cited

U.S. PATENT DOCUMENTS

| | | | |
|---|---|---|---|
| 3,632,538 | 1/1972 | Kauder | 260/23 X |
| 3,787,357 | 1/1974 | Brecker | 260/45.75 K |
| 3,803,083 | 4/1974 | Brecker | 260/45.75 R |
| 3;810,868 | 5/1974 | Weisfeld et al. | 260/45.75 K |
| 3,887,519 | 6/1975 | Weisfeld et al. | 260/45.75 K |
| 3,894,989 | 7/1975 | Collins et al. | 260/45.75 S |
| 3,905,933 | 9/1975 | Itoh et al. | 260/31.6 |
| 3,925,246 | 12/1975 | Coates et al. | 252/400 R |
| 3,953,385 | 4/1976 | Dworkin et al. | 260/2.5 P |
| 3,987,005 | 10/1976 | Collins et al. | 260/45.75 S |
| 3,998,782 | 12/1976 | Hutton et al. | 260/45.8 R |

FOREIGN PATENT DOCUMENTS 59-38250 3/1984 Japan .

*Primary Examiner*—Joseph L. Schofer
*Assistant Examiner*—N. Sarofim
*Attorney, Agent, or Firm*—Richard J. Schlott

[57] ABSTRACT

A composition comprising a dioctyl tin mercaptide, a zinc salt of a fatty acid such as zinc stearate and a conventional phosphite ester stabilizer is effective in stabilizing PVC resins. The stabilized resins exhibit excellent initial color and stability under processing conditions.

6 Claims, No Drawings

STABILIZATION COMPOSITION FOR CLEAN, IMPACT-MODIFIED PVC

BACKGROUND OF THE INVENTION

This invention relates to stabilized polyvinyl chloride compositions and more particularly to stabilizer compositions comprising a phosphite compound, an organo zinc compound and a sulfur-containing organo tin compound and to polyvinyl chloride compositions containing such stabilizers.

The use of organo tin mercapto carboxylic esters or organo tin mercaptides as stabilizers for polyvinyl chloride (PVC) has long been known and such compounds have gained wide acceptance in the PVC compounding art. Because of their low toxicity and stability at elevated processing temperatures, as well as the excellent initial color and clarity of the resulting PVC compositions, these compounds are particularly desirable in preparing rigid and semi-rigid PVC compositions for use in food packaging applications. In as much as alkyl tin compounds are quite expensive, the art has continued to seek alternative, lower-cost stabilizer and co-stabilizer systems, and to identify synergists and boosters for use with alkyl tin mercaptide stabilizers that would permit reducing the use level of the tin compound and thus lower the overall costs. Among the co-stabilizers identified for such use are those disclosed in U.S. Pat. Nos. 3,925,246, 3,632,538 and 3,953,385. Such co-stabilizers have included additional tin sulfide compounds, complex tin esters, hindered phenols, phosphites, epoxy compounds and metal soaps. Particular combinations of hindered phenols and phosphites have also been disclosed in U.S. Pat. No. 3,998,782 to be useful stabilizers for PVC, and these may be further combined with epoxy compounds, tin compounds, metallic soaps and the like.

Although these and similar stabilizing systems have had some success, the generally held view in the art is that none possess the attractive combination of high temperature stability, good initial color and long term stability characteristics typical of organo tin mercaptide compounds. A stabilizer system having such characteristics while reducing the requirement for the very expensive organo tin mercaptides would thus be a useful advance in the PVC compounding art.

SUMMARY

A stabilizer composition comprising an organo tin mercaptide, an organo phosphite and a zinc salt of carboxylic acid is a highly effective stabilizer for rigid and semirigid PVC. The stabilized PVC resins exhibit excellent color and clarity, and the level of organo tin mercaptide necessary for adequate stabilization is considerably reduced.

DESCRIPTION

The alkyl tin mercaptide stabilizers useful in the practice of this invention, more properly described as the alkyl esters of dialkyl tin bis mercapto carboxylic acids, may be any of those widely recognized in the art for use with PVC. A variety of such compounds are summarized for example in U.S. Pat. No. 3,632,538, and a number of such compounds are readily available from commercial sources. The preferred alkyl tin mercaptide stabilizers are dioctyl tin mercaptides, such as the complex mixture of dioctyl tin-bis alkyl mercapto acetates sold under the trade designation OTM by M&T Chemicals Company.

The phosphites useful for the purposes of this invention are those phosphite ester stabilizers well known in the art for use in stabilizing a variety of resins, and include the phosphite esters of phenol, aklylated phenols, alkanols and the like such as triphenyl phosphites, tris alkylated phenol phosphites, tris mono-, di- and trialkyl phenol phosphites, tris alkyl phosphites, alkyl diphenyl phosphites, and the like as well as the bis-alkyl and aryl esters of pentaerythritol diphosphites, and oligomeric and polymeric phosphite esters of diphenolic and bis phenolic compounds. Commercially available examples of such phosphite ester compounds include triphenyl phosphite, tris-nonylphenyl phosphite, diphenyl dodecyl phosphite, tris-dodecyl phosphite tri(di-t-butylphenyl)phosphite, distearyl pentaerythritol diphosphite, bis-(di-t-butylphenyl)pentaerythritol diphosphite, the oligomeric alkyl phosphites of bisphenol-A, and the like. Also useful are mixtures of two or more of such phosphite ester compounds. Such compounds have long been known for use as stabilizers in PVC and are widely available from commercial sources.

The zinc compounds useful in the practice of this invention are zinc salts of carboxylic acids, and more particularly are zinc salts of fatty acids such as zinc stearate and the like.

The stabilizer composition of this invention will consist of from 24 to 45 wt% alkyl tin mercaptide, from 45 to 70 wt% phosphite and from 6 to 11 wt% zinc salt. The composition will generally be employed in amounts of about 1 to about 5 parts by weight per hundred parts by weight (phr) of PVC resin, and preferably at a level which will provide from about 0.5 to about 2.0 phr of alkyl tin mercaptide.

The practice of this invention will be better understood by consideration of the following examples, offered by way of illustration of the invention and not in limitation thereof.

Example 1-9

A dry blend of 100 pbw PVC resin, 15 pbw ABS impact modifier, 5 pbw epoxidized soya and 0.25 pbw wax, together with the indicated stabilizer compositions, was prepared, then fluxed in a Brabender mixing head at 410°-415° F. Samples were withdrawn at flux, and then at 2 minute intervals and rated for color development. The rating system is based on a subjective visual comparison, with 1=clear and colorless, and 10=dark brown to black. The compositions and the color evaluations are summarized in Table 1.

TABLE 1

| | Example: | | | | | | | | | | |
|---|---|---|---|---|---|---|---|---|---|---|---|
| | A | B | 1 | 2 | 3 | 4 | 5 | 6 | 7 | 8 | 9 |
| Composition | | | | | | | | | | | |
| Resin, (pbw) | 100 | 100 | 100 | 100 | 100 | 100 | 100 | 100 | 100 | 100 | 100 |
| OTM, (phr) | 1.0 | 2.0 | 1.0 | 1.0 | 1.0 | 1.0 | 1.0 | 1.0 | 1.0 | 1.0 | 1.0 |
| ZnSt, (phr) | 0.25 | 0.25 | 0.25 | 0.25 | 0.25 | 0.25 | 0.25 | 0.25 | 0.25 | 0.25 | 0.25 |
| DPDP, (phr) | | | 1.0 | 1.5 | 3.0 | | | | | | |

TABLE 1-continued

| | Example: | | | | | | | | | | |
|---|---|---|---|---|---|---|---|---|---|---|---|
| | A | B | 1 | 2 | 3 | 4 | 5 | 6 | 7 | 8 | 9 |
| TDP, (phr) | | | | | | 1.0 | 1.5 | 3.0 | | | |
| TNPP, (phr) | | | | | | | | | 1.0 | 1.5 | 3.0 |
| Color | | | | | | | | | | | |
| Time (min.) | | | | | | | | | | | |
| initial | 1 | 1 | 1 | 1 | 1 | 1 | 1 | 1 | 1 | 1 | 1 |
| 2 | 2 | 2 | 1 | 1 | 1 | 3 | 1 | 1 | 1 | 1 | 1 |
| 4 | 4 | 3 | 1 | 1 | 1 | 3 | 1 | 1 | 2 | 2 | 2 |
| 6 | 7 | 3 | 3 | 2 | 2 | 4 | 2 | 1 | 4 | 4 | 4 |
| 8 | 10 | 5 | 4 | 3 | 3 | 5 | 3 | 2 | 6 | 6 | 6 |
| 10 | — | 7 | 4 | 4 | 4 | 10 | 7 | 3 | — | — | — |
| 12 | — | 10 | 10 | 6 | 8 | — | 10 | 5 | — | — | — |

Notes
OTM = dioctyl tin mercaptide, from M & T Chemicals;
ZnSt = zinc stearate;
DPDP = diphenyl dodecyl phosphite;
TDP = tridecyl phosphite;
TNPP = trisnonylphenyl phosphite.

It will be apparent from these color data as summarized in Table 1 that the stabilizing effectiveness of OTM for PVC as measured by color development in these tests is markedly improved by the addition of alkyl and aryl phosphites.

EXAMPLES 10-18

Further blends were made and evaluated by the procedures for Examples 1-9, using pentaerythritol diphosphite esters and bisphenol phosphite oligomer stabilizers, which are widely known phosphite stabilizers and in commercial use. The compositions and the color comparisons are summarized in Table 2.

TABLE 2

| | Example: | | | | | | | | |
|---|---|---|---|---|---|---|---|---|---|
| | 10 | 11 | 12 | 13 | 14 | 15 | 16 | 17 | 18 |
| Composition | | | | | | | | | |
| Resin, (pbw) | 100 | 100 | 100 | 100 | 100 | 100 | 100 | 100 | 100 |
| OTM, (phr) | 1.0 | 1.0 | 1.0 | 1.0 | 1.0 | 1.0 | 1.0 | 1.0 | 1.0 |
| ZnSt, (phr) | 0.25 | 0.25 | 0.25 | 0.25 | 0.25 | 0.25 | 0.25 | 0.25 | 0.25 |
| 618, (phr) | 1.0 | 1.5 | 3.0 | | | | | | |
| 626, (phr) | | | | 1.0 | 1.5 | 3.0 | | | |
| 439, (phr) | | | | | | | 1.0 | 1.5 | 3.0 |
| Color | | | | | | | | | |
| Time (min.) | | | | | | | | | |
| initial | 1 | 1 | 1 | 1 | 1 | 1 | 1 | 1 | 1 |
| 2 | 1 | 1 | 1 | 1 | 1 | 1 | 1 | 1 | 1 |
| 4 | 2 | 2 | 2 | 2 | 1 | 2 | 2 | 2 | 2 |
| 6 | 3 | 3 | 3 | 3 | 2 | 2 | 3 | 3 | 2 |
| 8 | 4 | 4 | 4 | 4 | 3 | 3 | 4 | 3 | 2 |
| 10 | 5 | 5 | 5 | 7 | 4 | 3 | 10 | 5 | 3 |
| 12 | 7 | 5 | 5 | 10 | 6 | 4 | — | 10 | 4 |

Notes
618 = disteryl pentaerythritol diphosphite;
626 = di(di-t-butylphenyl)pentaerythritol diphosphite;
439 = bisphenol-A—alkyl phosphite oligomer.

As with the compositions of the previous examples, it will be apparent from the color data for these compositions that the addition of phosphites to combinations of alkyl tin mercaptides and zinc stearate provides a substantial benefit.

COMPARATIVE EXAMPLES C-G

Compositions were prepared comparable to Control Example A, but substituting calcium stearate (C) or magnesium stearate (D) for zinc stearate. The color development in each was substantially equivalent to that shown for Control Example A in Table 1.

Further comparative examples were prepared according to Example 16 of Table 2. Comparative Example E, with 0.25 phr calcium stearate in place of the zinc stearate of Example 16, and Comparative Example F, with 0.25 phr magnesium stearate in place of the zinc stearate of Example 16, were evaluated and found to have very poor early color.

An additional example, Comparative Example G, was prepared according to Example 9 of Table 1, using 1.5 phr OTM and 0.5 phr octyl tin maleate. This composition had poor early color, worse than that of Comparative Example B, without phosphite.

EXAMPLE 19

The composition of Example 16 was repeated with a combination of 0.125 phr calcium stearate and 0.125 phr zinc stearate in place of zinc stearate alone. The composition had a color performance equivalent to that of Example 16.

EXAMPLE 20

A composition was prepared using 0.125 phr magnesium stearate and 0.125 phr zinc stearate in place of the zinc stearate of Example 16. Again, the color performance of this composition was equivalent with that of Example 16.

It will thus be apparent from a consideration of the Examples 1-20 with the comparative examples that the improvement is noted only with combinations employing zinc salts, while other conventional metal salts are not effective.

EXAMPLE 21

A composition was prepared according to Example 18, but substituting a conventional methyl methacrylate-acrylonitrile-styrene-butadiene based graft copolymer impact modifier for the ABS modifier. The color development for this blend was equivalent to that shown for Example 18.

The invention will thus be seen to be a stabilizer composition for use with PVC resins comprising an alkyl tin mercaptide, a zinc salt and a phosphite and stabilized PVC compositions. It will be apparent to those skilled in the art that further modifications such as the including of additional materials such as β-diketones, 1,4-Dihydropyridines, u.v. stabilizers, plasticizers, pigments, colorants, fillers, reinforcing aids and other such resin modifiers may be made to provide resin compositions for particular end uses without deviating from the spirit and scope of the invention, which is defined solely by the appended claims.

I claim:

1. A stabilizer composition adapted for use in stabilizing PVC consisting of a dialkyl tin mercaptide, a zinc salt of a fatty acid and a phosphite.

2. the stabilizer composition of claim 1 wherein the dialkyl tin mercaptide is a dialkyl ester of a dialkyl tin bis mercapto carboxylic acid and the zinc salt is zinc stearate.

3. The stabilizer composition of claim 1 consisting of from 24 to 45 wt% dialkyl ester of a dialkyl tin bis mercapto carboxylic acid, from 6 to 11 wt% zinc stearate and from 45 to 70 wt% of a phosphite ester stabilizer.

4. The stabilizer composition of claim 1 consisting of from 24 to 45 wt% dioctyl tin mercaptide, from 6 to 11 wt% zinc stearate and from 45 to 70 wt% of a phosphite ester stabilizer.

5. The composition of claim 4 wherein the phosphite ester stabilizer is selected from the group consisting of tris-nonylphenyl phosphite, tridecyl phosphite, diphenyl dodecyl phosphite, distearyl pentaerythritol diphosphite, bis-(di-t-butylphenyl)pentaerythritol diphosphite and bisphenol-A-alkyl phosphite oligomer.

6. A PVC composition comprising PVC and a stabilizing amount of a stabilizer composition consisting of from 24 to 45 wt% of a dialkyl tin mercaptide, from 6 to 11 wt% of a zinc salt of a fatty acid and from 45 to 70 wt% of a phosphite ester stabilizer.

* * * * *

UNITED STATES PATENT OFFICE
CERTIFICATE OF CORRECTION

Patent No. 4,614,756 Dated September 30, 1986

Inventor(s) LEO L. VALDISERRI

It is certified that error appears in the above-identified patent and that said Letters Patent are hereby corrected as shown below:

Please correct the title to read:

"STABILIZATION COMPOSITION FOR CLEAR, IMPACT-MODIFIED PVC"

Signed and Sealed this

Twenty-third Day of December, 1986

*Attest:*

DONALD J. QUIGG

*Attesting Officer* *Commissioner of Patents and Trademarks*